United States Patent [19]

Ogawa et al.

[11] Patent Number: 5,325,107
[45] Date of Patent: Jun. 28, 1994

[54] METHOD AND APPARATUS FOR DRIVING A DISPLAY DEVICE

[75] Inventors: Ikuo Ogawa, Nara; Akio Inohara, Osaka; Toshihiro Ohba; Hiroshi Kishishita, both of Nara; Hisashi Uede, Wakayama, all of Japan

[73] Assignee: Sharp Kabushiki Kaisha, Osaka, Japan

[21] Appl. No.: 68,300

[22] Filed: May 28, 1993

Related U.S. Application Data

[63] Continuation of Ser. No. 853,866, Mar. 20, 1992, abandoned, which is a continuation of Ser. No. 443,483, Nov. 30, 1989, abandoned.

[30] Foreign Application Priority Data

Nov. 30, 1988 [JP] Japan .................. 63-304955

[51] Int. Cl.⁵ .................................................. G09G 3/30
[52] U.S. Cl. ........................................ 345/79; 345/77; 315/169.3
[58] Field of Search ............ 340/781, 805, 811, 793, 340/763, 784; 315/169.3, 169.4; 307/76, 84; 345/76, 77, 78, 79, 80, 60, 63, 211, 212

[56] References Cited

U.S. PATENT DOCUMENTS

| | | | |
|---|---|---|---|
| 4,349,816 | 9/1982 | Miller et al. | 340/781 |
| 4,366,504 | 12/1982 | Kanatani et al. | |
| 4,496,879 | 1/1985 | Suste | 315/169.4 |
| 4,554,539 | 11/1985 | Graves | 340/781 |
| 4,613,793 | 9/1986 | Panicker et al. | 340/781 |
| 4,864,182 | 9/1989 | Fujioka et al. | 340/781 |

FOREIGN PATENT DOCUMENTS

| | | |
|---|---|---|
| 59-198022 | 9/1984 | Japan . |
| 2186730 | 8/1987 | United Kingdom . |

*Primary Examiner*—Alvin E. Oberley
*Assistant Examiner*—Xiao M. Wu

[57] ABSTRACT

A display device, such as thin film EL display device, is formed by interposing a dielectric layer between a plurality of scanning electrodes and a plurality of data electrodes which are arranged at right angles. Modulation voltage is varied in accordance to the display data, and is applied to the data electrodes. Further, a writing voltage is applied to the scanning electrodes in sequential line order, to thereby perform gradation display. Further, the writing voltage includes a ramp voltage, which varies with time. Thus, the peak of the current flowing through the luminescent layer of the picture element, as a current contributing to the luminescence, is suppressed to a low level. contributing to the luminescence, is suppressed to a low level. Accordingly, the energization period of the current is also elongated. Thus gradation display over multiple levels is made possible and a stable display of different gradation levels is enabled.

16 Claims, 11 Drawing Sheets

MODULATION VOLTAGE VM

FIG. 3(2)
Prior Art

WRITING VOLTAGE VW

FIG. 3(3)
Prior Art

VOLTAGE APPLIED TO PICTURE ELEMENT VA

FIG. 10(1)
MODULATION VOLTAGE VM

FIG. 10(2)
WRITING VOLTAGE Vpw

FIG. 10(3)
VOLTAGE APPLIED TO PICTURE ELEMENT VA

FIG. 11(1)

MODULATION VOLTAGE VM

FIG. 11(2)

WRITING VOLTAGE −VNW

FIG. 11(3)

VOLTAGE APPLIED TO PICTURE ELEMENT VA

METHOD AND APPARATUS FOR DRIVING A DISPLAY DEVICE

This application is a X continuation, of application Ser. No. 07/853,866 filed on Mar. 20, 1992, which is a continuation Ser. No. 07/443,483 filed on Nov. 30, 1989, now abandoned

BACKGROUND OF THE INVENTION

1. Field of the invention

The present invention relates to a method and an apparatus for driving a capacitive flat matrix display panel such as a thin film EL display device and/or plasma display.

2. Description of the prior art

A double insulation type (or 3-layer structure) thin film EL element, for example, is formed in the following way.

Figure 1:
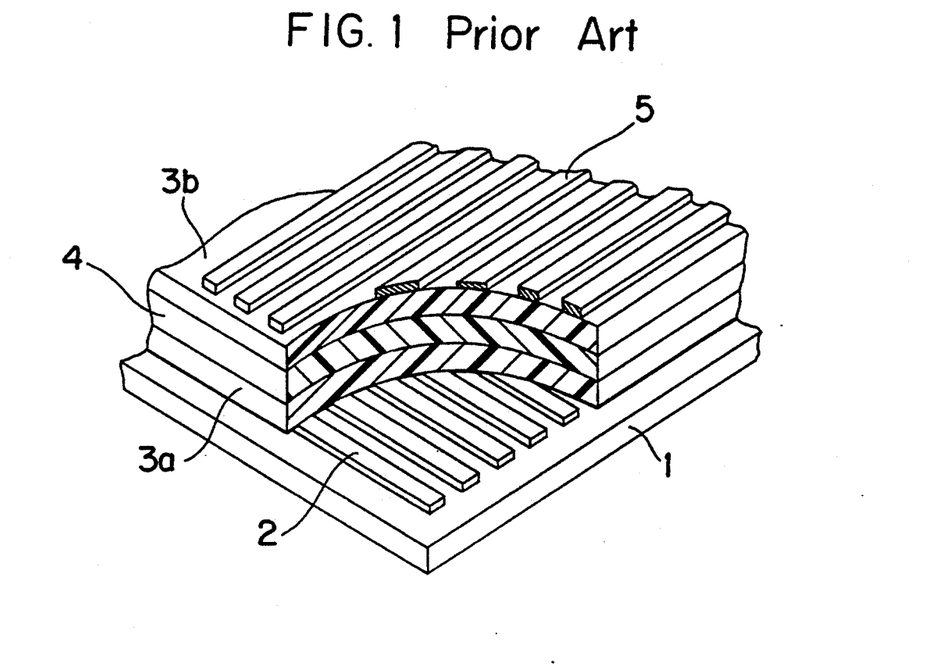
FIG. 1 is a perspective view, partly broken away, of a thin film EL element.

As shown in FIG. 1, strips of transparent electrodes 2 made of $In_2O_3$ are provided, in parallel, on a glass substrate 1. Over these transparent electrodes 2 are formed a layer of dielectric materials, 3a such as $Y_2O_3$, $Si_3N_4$ and $Al_2O_3$ and an layer of EL material 4, made of ZnS which is doped with an activation agent such as Mn. Further, a layer of dielectric material 3b is included, such as $Y_2O_3$, $Si_3N_4$, $TiO_2$ and $Al_2O_3$ similar to the above layer 3a, by means of thin film forming technique such as vacuum evaporation or sputtering. Thus, a 3-layer structure is created, each of thickness from 500 to 10000 Å. Over this 3-layer structure is provided parallel strips of back electrodes 5 made of aluminum arranged at right angles to the transparent electrodes 2.

Figure 2:
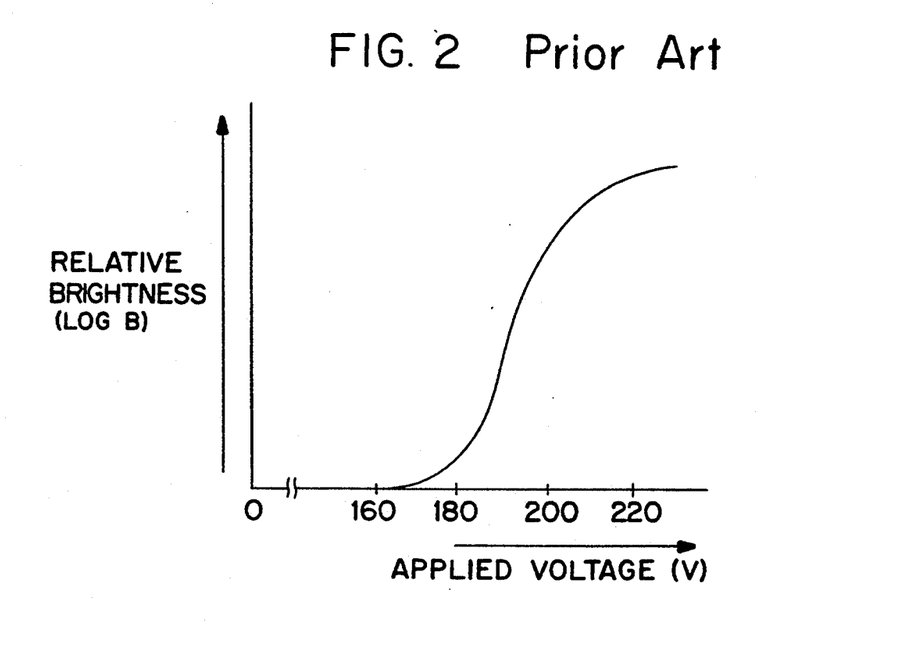
FIG. 2 is a graph illustrative of the applied voltagebrightness characteristic of the thin film EL element.
Figure 3:
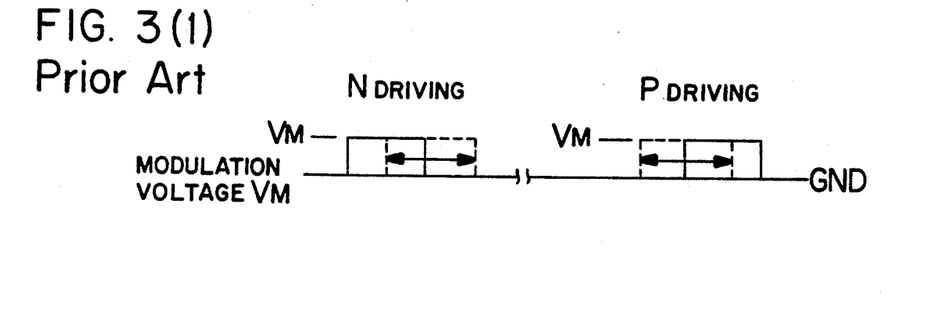
Figure 4:
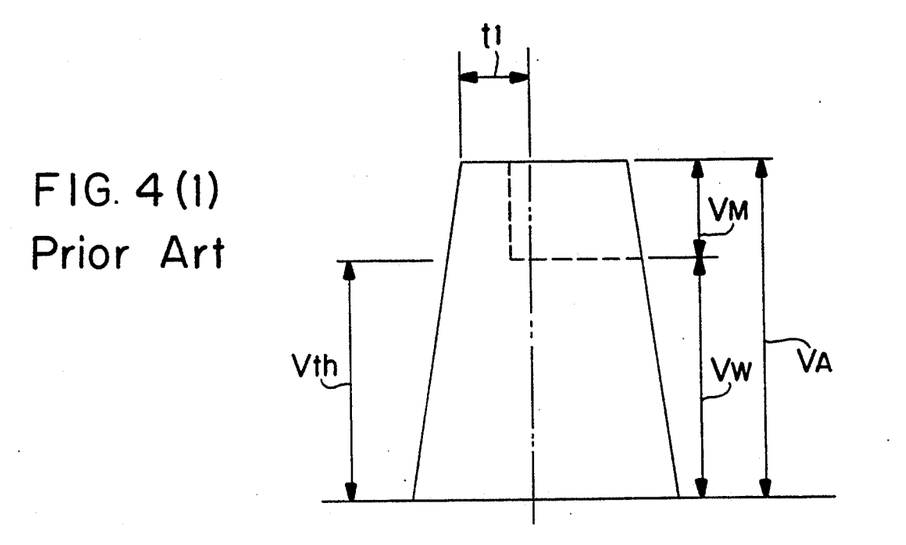

Because the thin film EL element is formed by interposing an EL material 4 which is sandwiched by dielectric material layers 3a and 3b between electrodes, it can be regarded as a capacitive element in terms of an equivalent circuit. As is apparent from the voltage-brightness characteristic shown in FIG. 2, the thin film EL element is driven by applying a relatively high voltage of about 200 V.

Basic display operation of a thin film EL display device which uses the thin film EL element as the display panel is driven, while using the transparent electrodes 2 of the thin film EL element as the data electrodes and using the back electrodes 5 as the scanning electrodes, by applying a modulation voltage, corresponding to the display data which determines whether to illuminate display elements or not, to the data electrodes and applying writing voltage to the scanning electrodes in the order of the lines. With this display drive method, superposition or cancellation between the writing voltage and the modulation voltage occurs in the part of picture elements of the EL layer where the scanning electrodes and the data electrodes intersect, resulting in a voltage higher than the luminescence threshold voltage or below the luminescence threshold voltage applied to the picture element. This thereby makes each picture element illuminate or not, respectively, to achieve the specified display pattern.

A popular method of driving such a thin film EL display device of the prior art, which is adopted to provide gradation display by changing the brightness of each picture element in multiple levels, is the pulse width modulation method. In this method, pulse duration of the modulation voltage applied to the data electrode is changed in accordance to the gradation display data (brightness data) to thereby control the area (intensity) of the voltage applied to the picture element.

FIG. 3 (1), (2) and (3) show the waveforms of a modulation voltage $V_M$ applied to the data electrode, a writing voltage $V_W$ applied to the scanning electrode and a voltage $V_A$ applied to the picture element in the pulse width modulation method.

In this case, a symmetrical driving method as described below is generally adopted since it is capable of maintaining display quality of a thin film EL element which is driven with alternate current; the symmetrical driving method completes one frame of display with an N-driven field which uses a voltage $-V_{NW}$ having a level corresponding to the luminescence threshold voltage $-V_{th}$ and of a reverse polarity to the modulation voltage $V_M$; and a P-driven field which uses a writing voltage $V_{PW}$ of a level, which corresponds to the sum $(V_{th}+V_M)$ of the luminescence threshold voltage $V_{th}$ and the modulation voltage $V_M$, having the same polarity as the modulation voltage $V_M$.

Either with the N driving or with the P driving, voltage $V_A$ which is applied to the data electrode is given as the difference of the potential $V_X$ of the data electrode and the potential $V_Y$ of the scanning electrode $V_X-V_Y$. In the N driving, voltage $V_A$ of a waveform, which is the modulation voltage $V_M$ superimposed on the absolute value $V_{NW}$ of the writing voltage $-V_{NW}$, is applied to the picture element as shown in FIG. 3 (3). Therefore, the voltage beyond the luminescence threshold voltage $V_{th}$ is applied in the section where the modulation voltage $V_M$ and the writing voltage $V_{PW}$ are superimposed. That is, area (intensity) of the voltage $V_A$ applied to the picture element in the N driving increases as the pulse duration of the modulation voltage $V_M$ elongates, and decreases as the pulse duration becomes shorter, as shown by the dashed lines in FIG. 3 (1) and (2).

On the other hand, in the P driving, voltage $V_A$ of a waveform which is the writing voltage $V_{PW}$ subtracted by the modulation voltage $V_M$ is applied to the picture element. Therefore a voltage beyond the luminescence threshold voltage $V_{th}$ is applied in the section where the modulation voltage $V_M$ and the writing voltage $V_{PW}$ are not superimposed. That is, in P driving, the area (intensity) of the voltage $V_A$ applied to the picture element increases as the pulse duration of the modulation voltage $V_M$ becomes shorter, as shown by the dashed lines in FIG. 3 (1) and (2).

As described above, either in the N driving or the P driving, gradation display is performed by variably setting the pulse duration of the modulation voltage $V_M$ in accordance to the gradation to be displayed (voltage changes in opposite senses in N driving and P driving).

However, the above driving method has been suffering a problem of unstable gradation brightness and being unable to set many gradation levels, as described in the following.

FIG. 4 (1), (2) and (3) show, for the purpose of explaining the cause of the problem, the voltage waveform applied to the picture element, the waveform of the accompanying current of the power source and the waveform of current flowing through the luminescent layer of the picture element, respectively, in the conventional pulse width modulation method.

Voltage $V_A$ shown in FIG. 4 (1) corresponds to the waveform shown in FIG. 3 (3). When Voltage $V_A$ of square waveform is applied to the picture element, current of the power source takes the waveform as shown in FIG. 4 (2).

That is, the current flowing, before the Voltage $V_A$ reaches the luminescence threshold voltage $V_{th}$ nearly a constant current which flows through the capacitive component of the picture element and does not contribute to the luminescence. When the Voltage $V_A$ reaches the luminescence threshold voltage $V_{th}$, the current component which flows through the luminescent layer of the picture element, or the current component which contributes to the luminescence, is added to that flowing through the capacitive component of the picture element. This results in the current flowing through the luminescent layer being that shown in FIG. 4 (3). Illumination brightness of the picture element increases in proportion to the current flowing through the luminescent layer.

When the pulse duration of the modulation voltage $V_M$ is limited as shown by the dashed line in FIG. 4 (1), the current flowing through the luminescent layer is shut off when the modulation voltage $V_M$ drops. Thus the current flowing through the luminescent layer of the picture element is controlled by controlling the pulse duration of the modulation voltage $V_M$, and a brightness corresponding to the pulse duration of the modulation voltage $V_M$ can be obtained.

However, as described above, in the case where the writing voltages $-V_{NW}$ and $V_{PW}$ are applied to the picture element in square waveforms, current flowing through the luminescent layer forms a peaked shape as shown in FIG. 4 (3). This leads to a shorter energization period (denoted by t1 in FIG. 4 (1)) and makes it impossible to set the modulation voltage $V_M$ in multiple levels and to control the brightness in multiple levels. In addition, because larger current flows through the luminescent layer in each brightness level, a slight deviation in the pulse duration of the modulation voltage $V_M$ causes a significant variation in the brightness, thus making it difficult to stabilize the brightness gradation.

SUMMARY OF THE INVENTION

An object of the invention is to provide a method and apparatus of driving a display device, such as thin film EL display device, which are capable of displaying in multiple gradation levels and capable of displaying the gradation of each level stably.

The invention provides a method for driving a display device interposing a dielectric layer between a plurality of scanning electrodes and a plurality of data electrodes arranged in directions intersecting each other, by applying a modulation voltage having its pulse width varied according to gradation display data to the data electrode, and by applying a writing voltage in a sequential line order to the scanning electrodes in which, a ramp voltage, which varies in amplitude with time, is applied to the scanning electrodes as the writing voltage.

According to the invention, time variation rate of the ramp voltage is predetermined and therefore is a primary function which varies with time.

Further, the invention provides an apparatus of driving a display device comprising:

a display apparatus which is formed by interposing a dielectric layer between a plurality of scanning electrodes and a plurality of data electrodes, arranged at right angles, a data electrodes drive circuit for applying a modulation voltage, of which pulse duration is changed in accordance to the gradation display data, to the data electrode, and a scanning electrode drive circuit for applying a ramped writing voltage, which varies in amplitude with time, to the scanning electrodes in the sequential order of the lines.

Further, the invention provides an apparatus for driving a display device where the variation rate of the ramped writing voltage with time is predetermined and therefore the ramp voltage changes as a primary function of time. Further, the scanning electrode drive circuit of the inventions comprises:

a threshold voltage generator circuit for generating the threshold voltage of the dielectric layer which is maintained at a constant level during the scanning period, and a ramp voltage generator circuit for generating a part of the ramp voltage which is added to the threshold voltage and changes with time during the scanning period.

Further, the ramp voltage generator of the invention comprises:

a capacitor which is serially connected to the output of the threshold voltage generator, a voltage-current converter circuit which is serially connected to the, for controlling a charging current of the capacitor which corresponds to the input voltage, and a ramp voltage control circuit for supplying the voltage-current converter circuit with a voltage which changes at a constant changing rate with time.

Further, the invention provides a driving apparatus for a display device where one frame includes a pair of fields and voltages applied to the dielectric layer are of opposite polarities in one field and the other field.

According to the invention, because the ramp voltage is applied to the scanning electrodes as the writing voltage, a peak value of the current which flows through the luminescent layer of the picture element and contributes to the luminescence is suppressed to a low level and the energization period of the current is elongated, thereby enabling the setting of the pulse duration of the modulation voltage at a plurality of levels. The current flowing through the luminescent layer at each level of brightness is reduced in order to stabilize the gradation of each brightness level.

Because the driving method of the invention for a display device applies the ramp voltage to the scanning electrodes as the writing voltage, peak value of the current which flows through the luminescent layer of the picture element and contributes to the luminescence is suppressed to a low level and the energization period of the current is elongated, thereby enabling the setting of the pulse duration of the modulation voltage at a plurality of levels and to stabilize the gradation display of each brightness level.

BRIEF DESCRIPTION OF THE DRAWINGS

These objects, features and advantages of the invention will be more apparent from the detailed explanations given in the following and the drawings.

FIG. 3 (1), (2) and (3) show the waveforms of a modulation voltage, a writing voltage and a voltage applied to picture elements in the case of the driving method of the prior art, respectively;

FIG. 4 (1), (2) and (3) show the waveforms of the voltage applied to the picture elements, power current and current which flows through the luminescent layer of the picture elements in the case of the conventional driving method, respectively;

FIG. 7 is a circuit diagram showing the specific constitution of the ramp voltage generator circuit 21a;

FIG. 10 (1), (2) and (3) show the waveforms of a modulation voltage $V_M$, a writing voltage $V_{PW}$ and a voltage $V_A$ applied to the picture elements, respectively, in the P driving;

FIG. 11 (1), (2) and (3) show the waveforms of a modulation voltage $V_M$, a writing voltage $-V_{NW}$ and a voltage $V_A$ applied to picture elements, respectively, in the N driving, and FIG. 12 (1), (2) and (3) show the waveforms of a voltage applied to the picture elements, a power current and a current which flows through the luminescent layer of the picture elements, respectively.

DETAILED EXPLANATIONS OF A PREFERRED EMBODIMENT

A preferred embodiment of the invention will be explained in detail in the following referring to the drawings.

Figure 5:
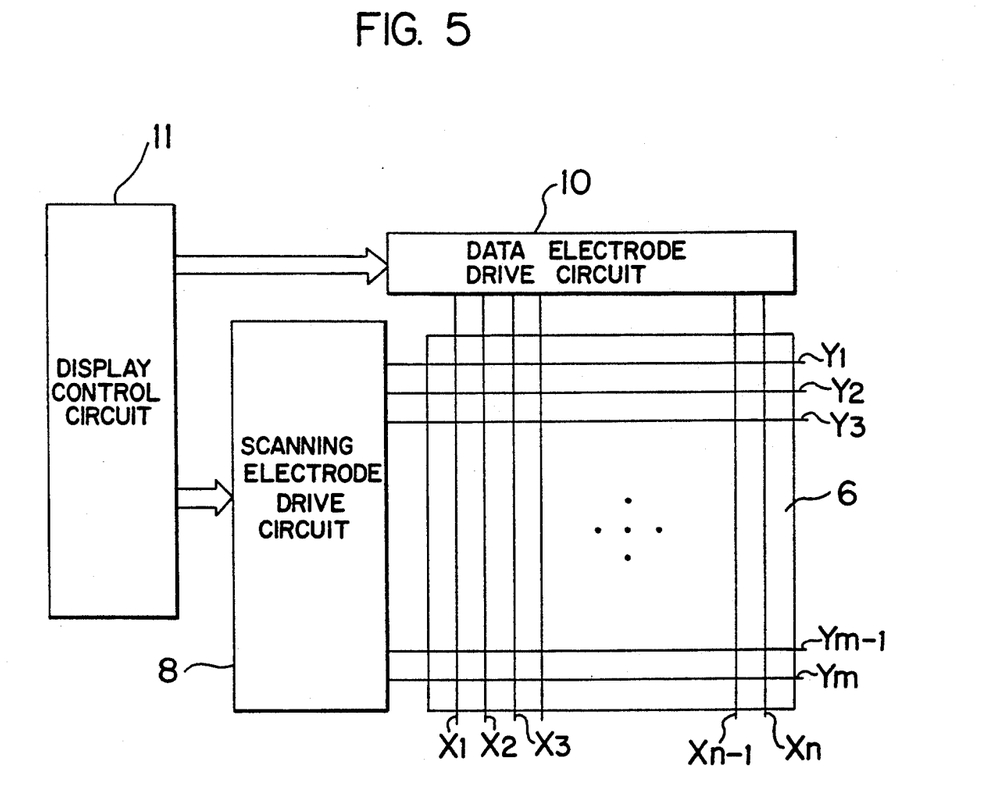
FIG. 5 is a block diagram showing the schematic constitution of a thin film EL display device to which a driving method which is an embodiment of the invention is applied.

FIG. 5 is a block diagram showing the schematic constitution of the thin film EL display device to which the driving method, which is an embodiment of the invention, is applied. In this figure, the display device 6 comprises a thin film EL element and, since the specific constitution thereof is the same as that explained in the description of the prior art, explanation thereof is omitted here.

Scanning electrodes Y1, Y2, . . . , Ym (arbitrary an scanning electrode will be denoted by a symbol Y hereafter) of the display device 6 are connected to a scanning electrode driving circuit 8. Further, data electrodes X1, X2, . . . , Xm (arbitrary an data electrode will be denoted by a symbol X hereafter) of the display device 6 are connected to a data electrode driving circuit 10. To the scanning electrode drive circuit 8 and the data electrode drive circuit 10, is connected a display control circuit 11 which controls these circuits. The data electrode drive circuit 10 has a function of variably setting the pulse duration of a modulation voltage $V_M$ applied to each data electrode X in accordance to the gradation display data which is sent from the display control circuit 11.

Figure 6:
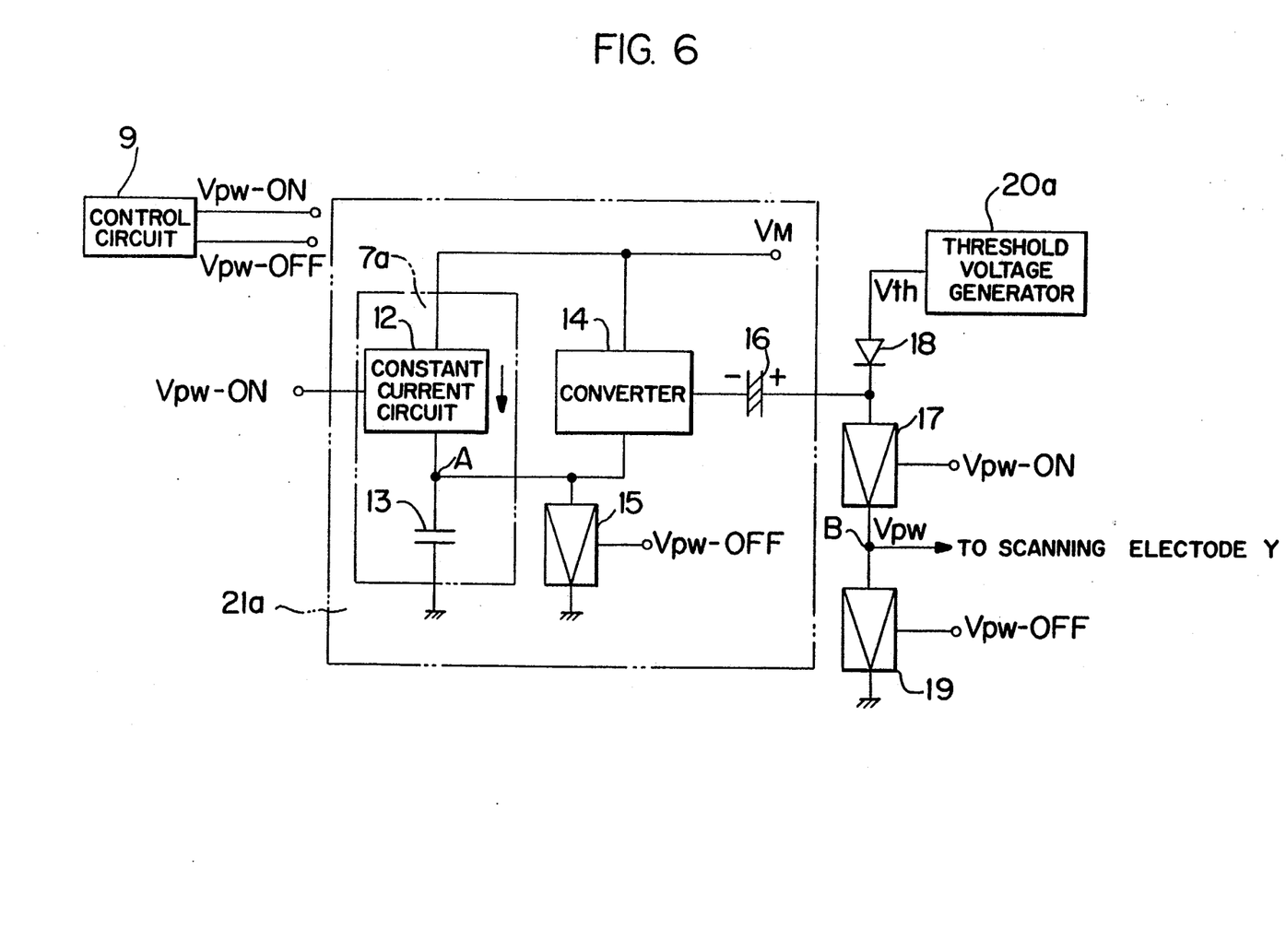
FIG. 6 is a block diagram showing the schematic constitution of a ramp voltage generator circuit 21a which is used in P driving of the thin film EL display device.

FIG. 6 is a block diagram showing the schematic constitution of the ramp voltage generator circuit 21a which supplies the ramp voltage to the output stage of the scanning electrode drive circuit 8 as a writing voltage $V_{PW}$. In other words, the ramp voltage generator circuit 21a is a circuit used in the P driving where the writing voltage $V_{PW}$ of the same polarity as that of the modulation voltage $V_M$ is applied to the scanning electrode Y. In FIG. 6, the constant current circuit 12 supplies a constant current upon receipt of a writing start signal $V_{PW}$—ON from a control circuit 9 of the scanning electrode drive circuit 8, and is connected to a power source $V_M$ and to one terminal of a capacitor 13, while another terminal of the capacitor is grounded. The ramp voltage control circuit 7a comprises the constant current circuit 12 and the capacitor 13.

A converter 14 supplies, upon receipt of the charging voltage (potential at connecting point A of the constant current circuit 12 and the capacitor 13) of the capacitor 13, a voltage output corresponding to the potential, and is connected to the power source $V_M$ and to the connecting point A. Also connected between the connecting point A and the ground is a switch 15 which clamps the potential at the connecting point A to the ground, upon receipt of a writing end signal $V_{PW}$—OFF sent from the control circuit 9 of the scanning electrode drive circuit 8.

An output terminal of the converter 14 is connected to one terminal of a switch 17 via a capacitor 16, and the terminal of the switch 17 is connected to a threshold voltage generator circuit 20a via a diode 18. The switch 17 has a function of supplying a voltage $(V_{th}+V_R)$, which is generated by synthesizing the luminescence threshold voltage $V_{th}$ and the output voltage $V_R$ of the converter 14, as the writing voltage $V_{PW}$, to the another terminal upon receipt of the writing start signal $V_{PW}$—ON.

To the another terminal of the switch 17 is connected one terminal of another switch 19, of which the other terminal is grounded. The switch 19 which clamps the potential at the connecting point B of the switch 17 and the switch 19 to the ground, upon receipt of the writing end signal $V_{PW}$—OFF. The point B is connected to a power line which supplies drive power to the scanning electrode Y of the last stage of the scanning electrode drive circuit 8.

Figure 7:
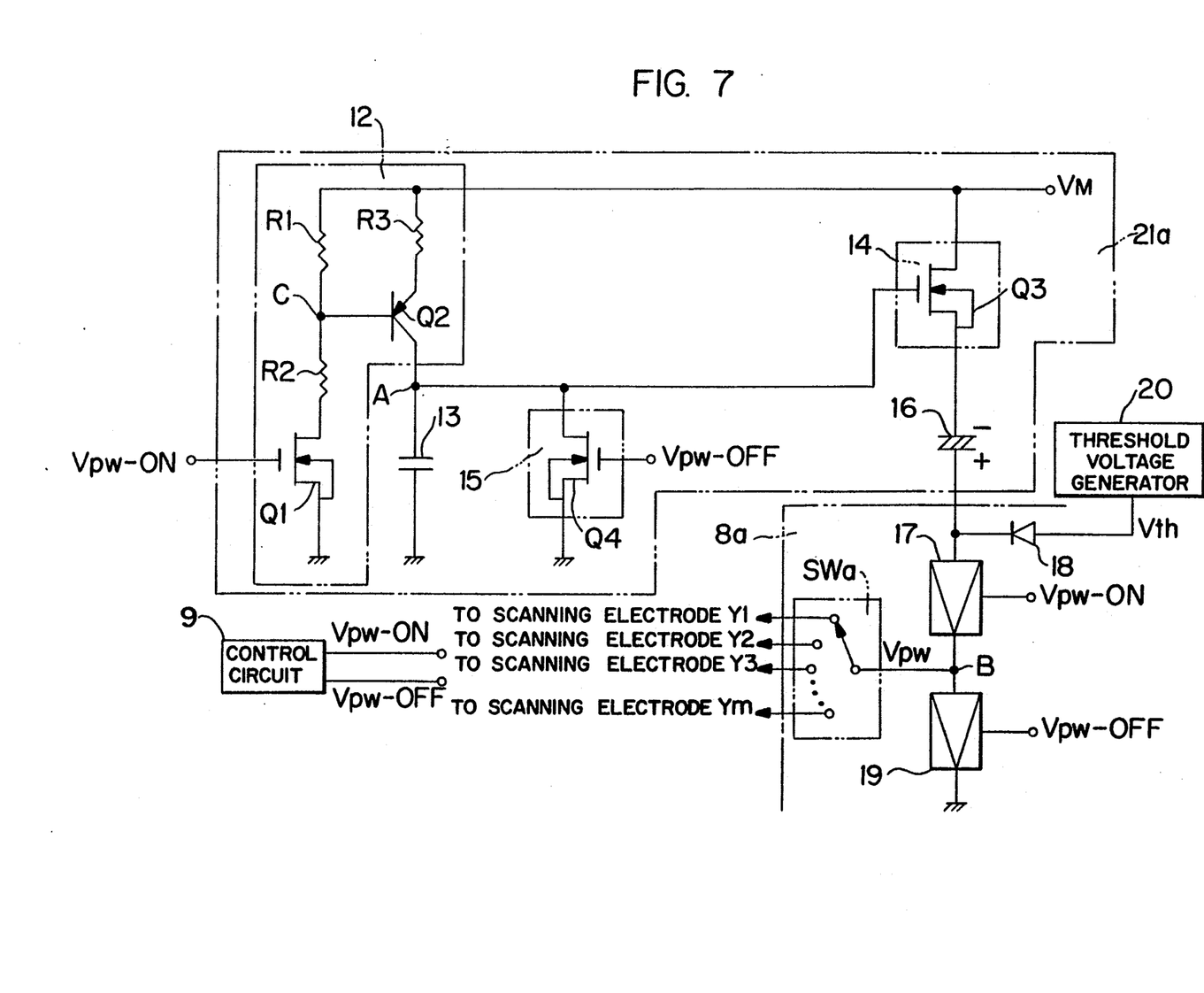

FIG. 7 is a circuit diagram showing an example of the specific constitution of the ramp voltage generator circuit 21a shown in FIG. 6. In FIG. 7, the constant current circuit 12 comprises resistors R1, R2 and R3, N channel type MOS transistor Q1 and PNP transistor Q2.

Resistors R1 and R2 are connected serially, with one lead of the resistor R1 connected to the power source $V_M$ and another lead of the resistor R2 connected to the drain of the N channel type MOS transistor Q1. The source of the transistor Q1 is grounded, and a highlevel voltage is fed to the gate of the transistor Q1 as the writing start signal $V_{PW}$—ON. To a connecting point C of the resistors R1 and R2 is connected the base of the PNP transistor Q2, of which emitter is connected to the power source $V_M$ via the resistor R3. The collector of the transistor Q2 is connected to one terminal of the capacitor 13.

The converter 14 is composed of an N channel MOS transistor Q3, of which the gate is connected to the connecting point A of the capacitor 13 and the transistor Q2. The drain of the transistor Q3 is connected to the power source $V_M$ and the source of the transistor Q3 is connected to one terminal of the capacitor 16.

The transistor Q3 is assumed to have a sufficient capacity of current supply and to have its source voltage not be affected by the output load of the scanning electrode drive circuit 8. The switch 15 is also composed of an N channel type MOS transistor Q4. The drain of the transistor Q4 is connected to the connecting point A, and its source is grounded. Further, the gate of the transistor Q4 is fed with a high level voltage as the writing end signal $V_{PW}$—OFF.

Another terminal of the capacitor 16 is connected to a high voltage line 8a of the scanning electrode drive circuit 8 which comprises a power source $V_{th}$, a diode 18, the switches 17 and 19, etc. The switches 17 and 19 are composed of known circuits consisting of a high withstanding voltage MOS transistor and other components. To the connecting point B is connected a switch SWa. By switching the switch SWa, the writing voltage $V_{PW}$ is applied to the scanning electrodes Y1 through Ym in the order of the scanning lines.

Figure 8:
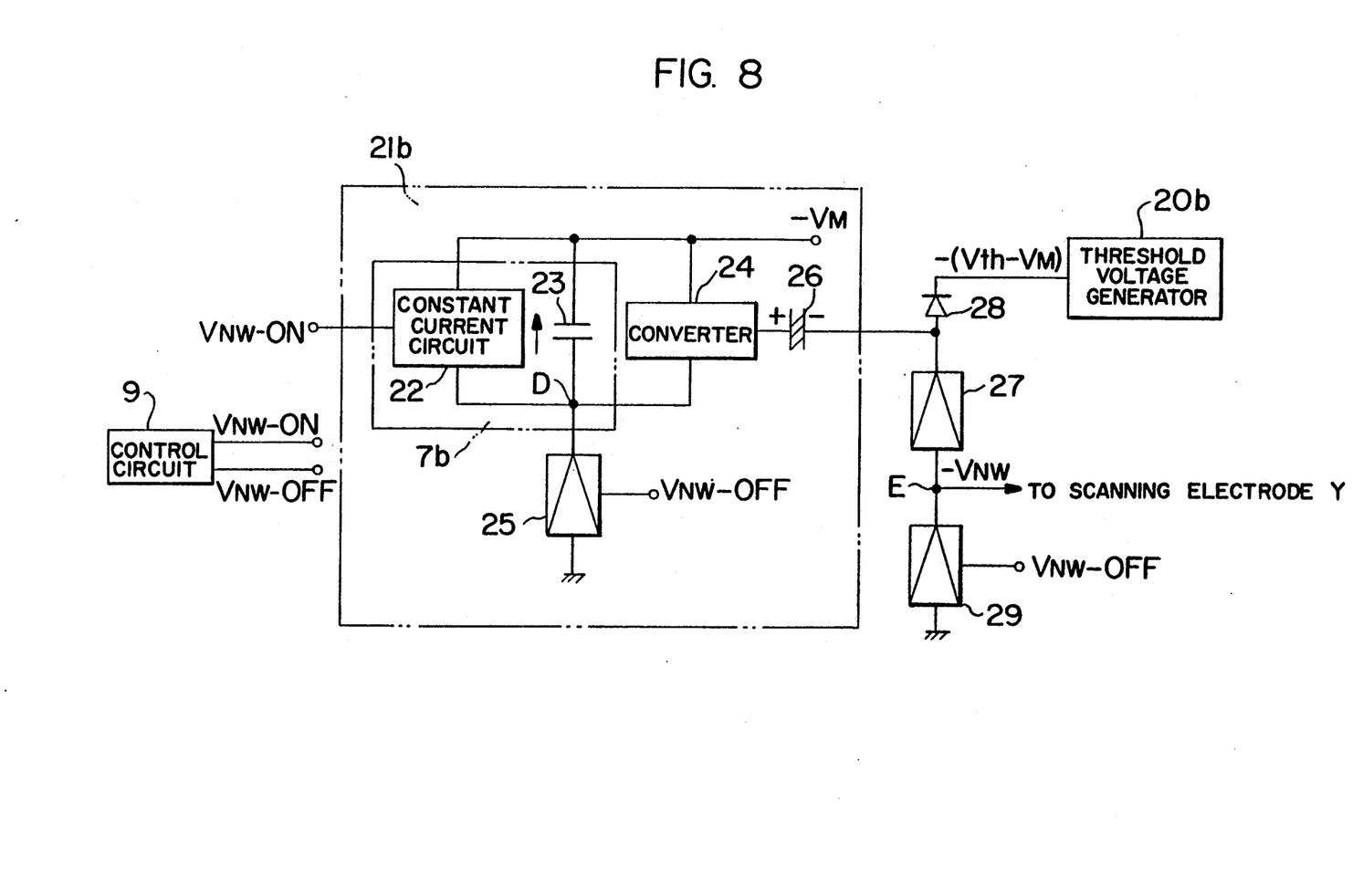
FIG. 8 is a block diagram showing the schematic constitution of a ramp voltage generator circuit 21b used in N driving of the thin film EL display device.

FIG. 8 is a block diagram showing the schematic constitution of another ramp voltage generator circuit 21b which supplies a ramp voltage to the output stage of the scanning electrode drive circuit 8 as a writing voltage $-V_{NW}$. In other words, the ramp voltage generator circuit 21b is a circuit used in the N driving where the writing voltage $-V_{NW}$, of a polarity reverse to that of the modulation voltage $V_M$, is applied to the scanning electrode Y. In FIG. 8, a constant current circuit 22 supplies a constant current upon receipt of a writing start signal $V_{NW}$—ON from the control circuit 9 of the scanning electrode drive circuit 8, and is connected to a power source $-V_M$. Further, a capacitor 23 is connected in parallel with the constant current circuit 22. The ramp voltage control circuit 7b comprises the constant current circuit 22 and the capacitor 23.

A converter 24 supplies, upon receipt of the charging voltage (potential at connecting point D of the constant current circuit 22 and the capacitor 23) of the capacitor 23, a voltage $V_R$ corresponding to the potential. It is connected to the power source $-V_M$ and to the connecting point D. Also connected between the connecting point D and the ground is a switch 25 which clamps the potential at the connecting point D to the ground, upon receipt of a writing end signal $V_{NW}$—OFF sent from the control circuit 9 of the scanning electrode drive circuit 8.

Further, an output terminal of the converter 24 is connected to one terminal of a switch 27 via a capacitor 26, and the terminal of the switch 27 is connected to a threshold voltage generator circuit 20b (a power source which supplies a voltage of negative polarity with the differential voltage of the luminescence threshold voltage and the modulation voltage) via a diode 28. The switch 27 has a function of supplying a voltage $-(V_{th}-V_M)+V_R$, which is generated by synthesizing the output voltage $V_R$ of the converter 24 and the output voltage of the threshold voltage generator circuit 20b, as the writing voltage $-V_{NW}$ to the another terminal upon receipt of the writing start signal $V_{NW}$—ON.

To the another terminal of the switch 27 is connected one terminal of another switch 29, of which the other terminal is grounded. The switch 29 has a function of clamping the potential at a connecting point E of the switch 27 and the switch 29 to the ground, upon receipt of the writing end signal $V_{NW}$—OFF. The point E is connected to a power line which supplies drive power to the scanning electrode Y of the last stage of the scanning electrode drive circuit 8.

Figure 9:
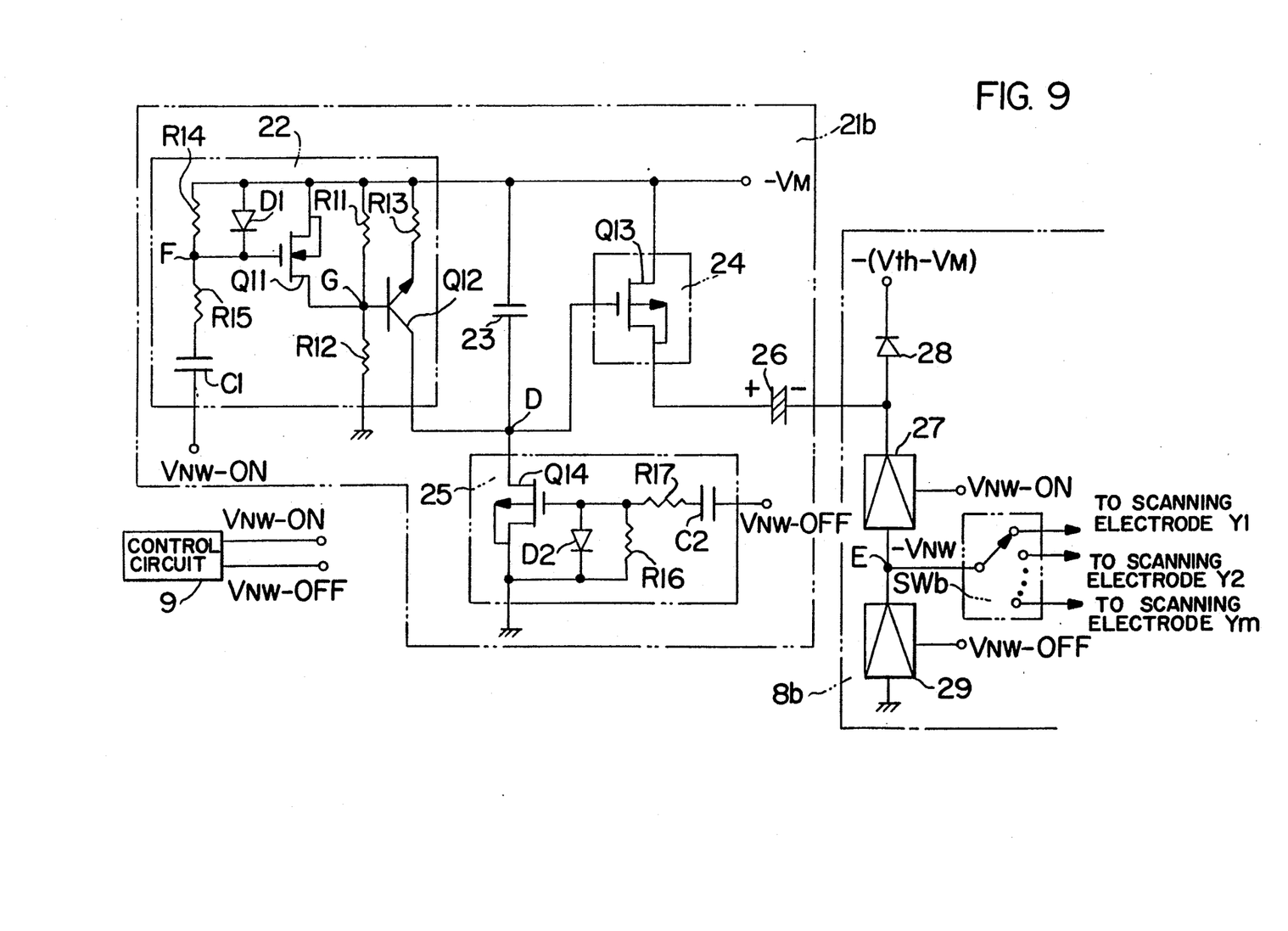
FIG. 9 is a circuit diagram showing the specific constitution of the ramp voltage generator circuit 21b.
Figure 10:
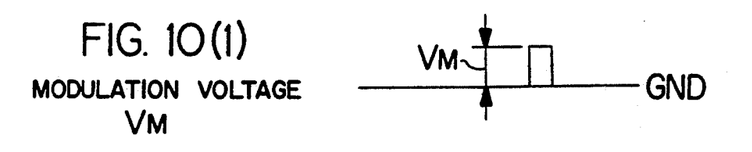
Figure 11:
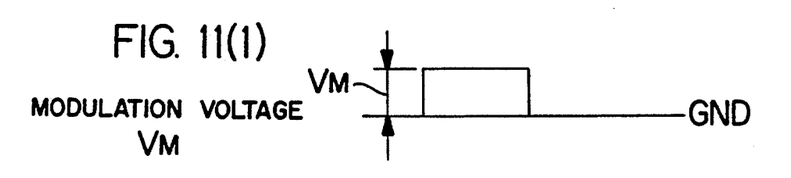
Figure 12:
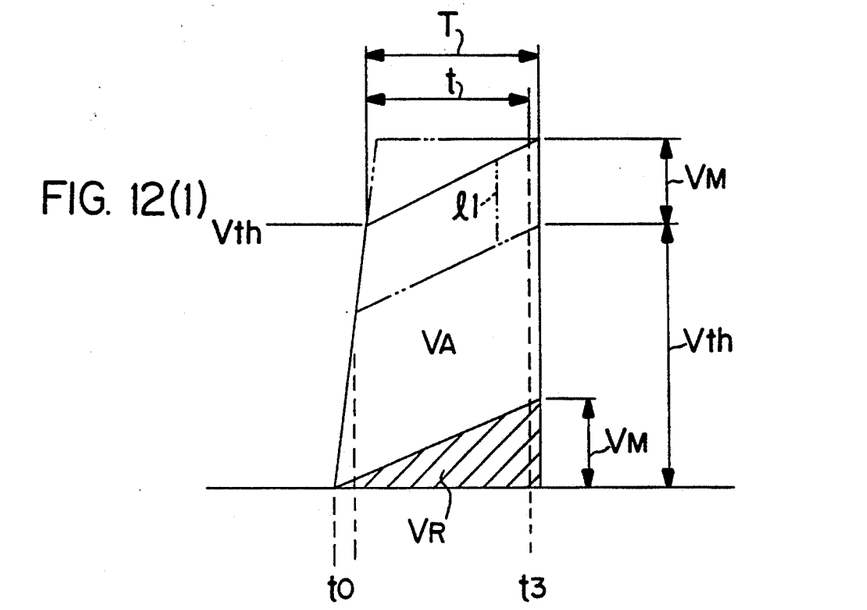

FIG. 9 is a circuit diagram showing an example of the specific constitution of the ramp voltage generator circuit 21b shown in FIG. 8. In FIG. 9, the constant current circuit 22 comprises resistors R11, R12, R13, R14 and R15, a diode D1, a capacitor C1, a N channel type MOS transistor Q11 and a NPN transistor Q12.

Resistors R14 and R15 are connected serially, with one lead of the resistor R14 connected to the power source $-V_M$ and another lead of the resistor R15 connected to one terminal of the capacitor C1. A high level voltage is fed to another terminal of the capacitor C1 as the writing start signal $V_{NW}$—ON. The diode D1 is connected in parallel with the resistor R14. A connecting point F of the resistors R14 and R15 is connected to the gate of the N channel type MOS transistor Q11, of which source is connected to the power source $-V_M$.

The resistors R11 and R12 are connected serially between the power source $-V_M$ and the ground, and to the connecting point G of the resistors R11 and R12 is connected the drain of the transistor Q11. To the connecting point G is also connected the base of the NPN transistor Q12. The emitter of the transistor Q12 is connected to the power source $-V_M$ via the resistor R13. The collector of the transistor Q12 is connected to one terminal of the capacitor 23.

The converter 24 is composed of a P channel MOS transistor Q13 of which the gate is connected to the connecting point D of the capacitor 23 and the transistor Q12. The drain of the transistor Q13 is connected to the power source $-V_M$, and the source of the transistor Q13 is connected to one terminal of the capacitor 26. The transistor Q13 is assumed to have a sufficient capacity of supplying current and its source voltage is not affected by the output load of the scanning electrode drive circuit 8.

The switch 25 is composed of a P channel type MOS transistor Q14, resistors 16 and 17, a diode D2 and a capacitor C2.

The source of the P channel type MOS transistor Q14 is grounded. Its drain is connected to the connecting point D, and between the source and the gate are connected the diode D2 and the resistor R16. The gate of the transistor Q14 is connected to one terminal of the capacitor C2, and another terminal of the capacitor C2 is fed with a low level voltage as the writing end signal $V_{NW}$—OFF.

Another terminal of the capacitor 26 is connected to a high voltage line 8b of the scanning electrode drive circuit 8 which comprises a power source $-(V_{th}-V_M)$, a diode 28, switches 27 and 29, etc. The switches 27 and 29 of the high voltage line are composed of known circuits consisting of a high withstanding voltage MOS transistors and other components. To the connecting point E is connected a switch SWb, and by switching the switch SWb, the writing voltage $-V_{NW}$ is applied to the scanning electrodes Y1 through Ym in the order of the lines.

FIG. 10 (1), (2) and (3) show the waveforms of the modulation voltage $V_M$ which is applied to the data electrode X, writing voltage $V_{PW}$ which is applied to the scanning electrode Y and the voltage $V_A$ which is applied to the picture elements, respectively, in the case of P driving which uses the writing voltage $V_{PW}$ obtained by the ramp voltage generator circuit 21a shown in FIG. 6 and FIG. 7, among the gradation display drive operations of the thin film EL display device.

FIG. 11 (1), (2) and (3) show the waveforms of the modulation voltage $V_M$, writing voltage $-V_{NW}$ and the voltage $V_A$, respectively, in the case of N driving which uses the writing voltage $-V_{NW}$ obtained by the ramp voltage generator circuit 21b shown in FIG. 8 and FIG. 9. With reference to these waveforms, the operation of driving the gradation display is explained in the following in the cases of the P driving and the N driving, individually. P driving In case the gate of the transistor Q1 and the switch 17 of the ramp voltage generator circuit 21a shown in FIG. 7 are supplied with high level voltage as the writing start signal $V_{PW}$—ON at time t0, the switch 17 is switched on to apply the luminescence threshold voltage Vth to the scanning electrode Y and, at the same time, to turn on the transistor Q1, resulting in a drop of the base potential of the transistor Q2 turning on the transistor Q2. This causes a constant current to start to flow through the resistor R3 and the transistor Q2 from the power source $V_M$ into the capacitor C13.

Charging voltage of the capacitor 13 increases at a constant rate with time from the ground potential to the potential $V_M$. Consequently, in the transistor Q3 which receives the charging voltage as the gate signal, its output, or the source voltage, increases in proportion to the charging voltage. That is, output of the transistor Q3 becomes the ramp voltage $V_R$ which increases at a constant rate with time. The ramp voltage $V_R$ is stored in the capacitor 16 and is added to the voltage of the power source Vth, to be applied to the scanning electrode Y as the writing voltage $V_{PW}$ of the waveform shown in FIG. 10 (2). In the waveform shown in FIG. 10 (2), the shaded part represents the voltage component borne by the ramp voltage $V_R$, and the dashed line shows the profile of the waveform of the writing voltage $V_{PW}$ in the case of prior art which does not use the ramp voltage generator circuit 21a.

When a certain period of time T has lapsed (time t3), the writing start signal $V_{PW}$—ON turns to the low level and the transistors Q1 and Q2 turn off, to apply a high level voltage as the writing end signal $V_{PW}$—OFF to the gate of the transistor Q4 of the ramp voltage generator circuit shown in FIG. 7. This causes the capacitor 13 to discharge, resulting in a rapid drop of the charging voltage of the capacitor 13 and, accordingly, drop of the ramp voltage VR. In this way, the scanning electrode drive circuit 8 applies the writing voltage $V_{PW}$ of a ramp waveform with pulse duration T as shown in FIG. 10 (2) to the scanning electrode Y.

To the data electrode X, on the other hand, modulation voltage $V_M$ of a square wave with a pulse duration corresponding to the gradation brightness to be displayed as shown by the solid line in FIG. 10 (1), is applied by the data electrode drive circuit 10.

As a result, voltage $V_A$ applied to the corresponding picture element takes the waveform of the writing voltage $V_{PW}$ of FIG. 10 (2) minus modulation voltage $V_M$ of FIG. 10 (1) as shown by the solid line in FIG. 10 (3). N driving In case the capacitor C1 and the switch 27 of the ramp voltage generator circuit 21b shown in FIG. 9 are supplied with high level voltage as the writing start signal $V_{NW}$—ON at time t0, the switch 27 is switched on to apply voltage —(Vth —VM) to the scanning electrode Y and, at the same time, to turn on the transistor Q11 and turn on the transistor Q12, to thereby lower the potential of the connecting point D which has been at the ground potential in the previous cycle. This causes a constant current to start to flow from the capacitor 23 into the power source —$V_M$, through transistor Q12 and the resistor R13.

Charging voltage of the capacitor 23 decreases at a constant rate with time from the ground potential to a potential —$V_M$. Consequently, in the transistor Q13, which receives the charging voltage as the gate signal, its output or, the source voltage, decreases in proportion to the charging voltage. That is, the output of the transistor Q13 becomes the ramp voltage $V_R$ which decreases at a constant rate with time.

The ramp voltage $V_R$ is added to the voltage of the power source—(Vth—VM) through the capacitor 26, to be applied to the scanning electrode Y as the writing voltage—$V_{NW}$ of the waveform shown in FIG. 11 (2). In the waveform shown in FIG. 11 (2), the shaded part represents the voltage component borne by the ramp voltage $V_R$, and the dashed line shows the profile of the waveform of the writing voltage—$V_{NW}$ in the case of the prior art which does not use the ramp voltage generator circuit 21b.

When a certain period of time T has lapsed (time t3), the writing start signal $V_{NW}$—ON turns to the low level and the transistors Q11 and Q12 turn off, to apply a low level voltage as the writing end signal $V_{NW}$—OFF to the capacitor C2 of the ramp voltage generator circuit 21b shown in FIG. 9. This turns on the transistor Q14 and causes the capacitor 23 to be charged. This results in a rapid rise of the potential of the connecting point D and, accordingly, a rise of the ramp voltage $V_R$. In this way, the scanning electrode drive circuit 8 applies the writing voltage—$V_{NW}$ of a ramp waveform with pulse duration T as shown in FIG. 11 (2) to the scanning electrode Y.

To the data electrode X, on the other hand, modulation voltage $V_M$ of the square wave with a pulse duration corresponding to the gradation brightness to be displayed as shown by the solid line in FIG. 11 (1) is applied by the data electrode drive circuit 10.

As a result, voltage $V_A$ applied to the corresponding picture element takes the waveform of absolute value of the writing voltage—$V_{NW}$ of FIG. 11 (2) minus modulation voltage $V_M$ of FIG. 11 (1) as shown by the solid line in FIG. 11 (3).

FIG. 12 (1), (2) and (3) shows the waveforms of the voltage applied to the picture element (corresponding to the waveform of FIG. 10 (3)), power current at this time and the current flowing through the luminescent layer of the picture element, respectively.

The power current waveform at this time has a longer energization period after the voltage $V_A$ exceeded the luminescence threshold voltage Vth as shown in FIG. 12 (2). That is, the voltage $V_A$ does not show a square waveform but shows a waveform obtained by synthesizing the modulation voltage $V_M$ of a square wave and the writing voltage $V_{PW}$ of a ramp waveform. Therefore, the power current does not take a peaked shape, but dampens gradually.

This tendency is directly reflected on the current flowing the luminescent layer of the picture element and, consequently, the current waveform has a peak which is suppressed to a low level and gradually dampens resulting in a longer energization period as shown in FIG. 12 (3).

On the other hand, gradation display is performed by setting the pulse duration of the modulation voltage $V_M$ in short multiple levels as shown by the alternate long/short dash line 11 in FIG. 12 (1), thereby shortening the energization period of the current flowing through the luminescent layer of the picture element shown in FIG. 12 (2). In this case, since the energization period of the current flowing through the luminescent layer of the picture element is longer than that in the prior art, the range where the pulse duration of the modulation voltage $V_M$ can be variably set, namely the effective region indicated by symbol t in FIG. 12 (1) is broadened, enabling easy gradation display in multiple levels.

Further, because the peak of the current flowing through the luminescent layer of the picture element is suppressed to a low level, the current for the brightness of each gradation is also redured. Thereby, the brightness is prevented from fluctuating greatly due to deviation of the pulse duration of the modulation voltage $V_M$, making it possible to display stable gradation level of each gradation.

The features described above which are enabled by using the writing voltage $V_{PW}$ of a ramp waveform are also similar in the case of N driving.

While the above embodiment has been explained for the case of driving a thin film EL display device, the spirit of the invention is not limited to this particular application, but can be applied to driving of other capacitive display devices such as plasma display for example.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A method for driving a display device including a dielectric layer interposed between a plurality of scanning electrodes and a plurality of data electrodes arranged in perpendicular directions with a picture element formed at each data and scanning electrode intersection, comprising the steps of:
   applying a modulation voltage, having its pulse width variable according to gradation display data, to each of the data electrodes;
   applying a writing voltage, in a line sequential order, to each of the scanning electrodes, wherein the writing voltage includes
      a ramp voltage of a first polarity, which varies with time, applied in a first field to each of the scanning electrodes and a ramp voltage of a second polarity, opposite to the first polarity, applied in a second field,
   wherein a combined modulation and writing voltage, applied to each of the picture elements, is symmetrical in amplitude, pulse width, and phase in each of the first and second fields and wherein an absolute value of the ramp voltage increases with time in each of the first and second fields.

2. A method for driving a display device as claimed in claim 1 wherein the time variation rate of the ramp voltage is predetermined and the ramp voltage changes as a primary function of time.

3. An apparatus for driving a display device including a dielectric layer interposed between a plurality of scanning electrodes and a plurality of data electrodes which are arranged at right angles, with a picture element formed at each data and scanning electrode intersection, the apparatus comprising:
   a data electrodes drive circuit for applying a modulation voltage, of which pulse width is varied according to gradation display data, to the data electrodes; and
   a scanning electrode drive circuit for applying a ramped writing voltage, which varies with time, to the scanning electrodes in a line sequential order, the ramped writing voltage including a ramp voltage of a first polarity, applied to each scanning electrode in a first drive field and a ramp voltage of a second polarity, opposite to said first polarity, applied to each scanning electrode in a second drive field,
   wherein a combined modulation voltage and writing voltage, applied to each of the picture elements, is symmetrical in amplitude, pulse width and phase in each of the first and second drive fields and wherein an absolute value of the ramp voltage increases with time in each of the first and second drive fields.

4. A driving apparatus for a display device as claimed in claim 3 wherein the time variation rate of the ramp voltage is predetermined and the ramp voltage changes as a primary function of time.

5. A driving apparatus for a display device as claimed in claim 3 wherein the scanning electrode drive circuit comprises:
   threshold voltage generator circuit for generating a threshold voltage of the dielectric layer, which is maintained at a constant level during the scanning period; and
   ramp voltage generator circuit for generating a ramped part of the writing voltage which is added to the threshold voltage and varies with time during the scanning period.

6. A driving apparatus for a display device as claimed in claim 5 wherein the ramp voltage generator circuit comprises:
   capacitor, connected in series with an output of the threshold voltage generator and the ramp voltage generator, for synthesizing the ramped part of the writing voltage to the threshold voltage;
   voltage-current converter circuit connected in series with the capacitor, for controlling charging current of the capacitor corresponding to input voltage; and
   ramp voltage control circuit for supplying the voltage-current converter circuit with an input voltage which varies at a constant changing rate with time.

7. A driving apparatus for a display device as claimed in claim 3 wherein one drive frame consists of a pair of drive fields and voltages applied to the dielectric layer are of opposite polarities in the first drive field and in the second drive field.

8. A method for driving a display device including a dielectric layer interposed between a plurality of parallel scanning electrodes and a plurality of parallel data electrodes, arranged perpendicular to the plurality of parallel scanning electrodes, with a picture element formed at each scanning and data electrode intersection, comprising the steps of:
   applying a modulation voltage, having a pulse width variable according to input gradation data for display, to each of the plurality of parallel data electrodes;
   producing a first ramp voltage, which varies in voltage level over a predetermined time period, of a first polarity;

producing a second ramp voltage, which varies in voltage level over said predetermined time period, of a second polarity, opposite to said first polarity;

applying a first writing voltage, including said first ramp voltage, in a first drive field of a drive frame, to each of the plurality of parallel scanning electrodes in a line sequential order; and applying a second writing voltage, including said second ramp voltage, in a second drive field of said drive frame, to each of the plurality of parallel scanning electrodes in a line sequential order, wherein a combined modulation and writing voltage, applied to each of the picture elements, is symmetrical in amplitude, pulse width and phase in each of the first and second drive fields and wherein an absolute value of each of the first and second ramp voltage increases with time in the first and second drive fields, respectively.

9. The method of claim 8, wherein said first and second ramp voltages are produced to have a varying voltage level over a predetermined time period.

10. The method of claim 8, further comprising the steps of:

generating a threshold voltage, of a voltage level sufficient to produce a visual display from said dielectric layer; and synthesizing said generated threshold voltage with said produced first and second ramp voltages to generate said first and second writing voltages, respectively.

11. The method of claim 10, wherein, prior to synthesizing said generated threshold voltage with said second ramp voltage, said threshold voltage is inverted in polarity.

12. An apparatus for driving a display device including a dielectric layer interposed between a plurality of parallel scanning electrodes and a plurality of parallel data electrodes, arranged perpendicular to the plurality of parallel scanning electrodes, with a picture element formed at each scanning and data electrode intersection, comprising:

data electrode drive means, operatively connected to the plurality of parallel data electrodes, for applying a modulation voltage, having a pulse width variable according to input gradation data for display, to each of the plurality of parallel data electrodes;

first scan electrode drive means, operatively connected to the plurality of parallel scanning electrodes, for producing a first ramp voltage, which varies in voltage level over a predetermined time period, of a first polarity; and second scan electrode drive means, operatively connected to the plurality of parallel scanning electrodes, for producing a second ramp voltage, which varies in voltage level over said predetermined time period, of a second polarity, opposite to said first polarity;

said first scan electrode drive means applying a first writing voltage, including said first ramp voltage, in a first drive field of a drive frame, to each of the plurality of parallel scanning electrodes in a line sequential order; and said second scan electrode drive means applying a second writing voltage, including said second ramp voltage, in a second drive field of said drive frame, to each of the plurality of parallel scanning electrodes in a line sequential order, wherein a combined modulation and writing voltage, applied to each of the picture elements, is symmetrical in amplitude, pulse width and phase in each of the first and second drive fields and wherein an absolute value of each of the first and second ramp voltage increases with time in the first and second drive fields, respectively.

13. The apparatus of claim 12, wherein the first scan electrode drive means produces a first ramp voltage which increases in voltage level over a predetermined time period, and said second scan electrode drive means produces a second ramp voltage which decreases in voltage level over said predetermined time period.

14. The apparatus of claim 12, further comprising:

threshold voltage generating means, operatively connected to said first and second scan electrode drive means, for generating a threshold voltage sufficient to produce a visual display from said dielectric layer; and synthesizing means for synthesizing said generated threshold voltage with said produced first and second ramp voltages, to generate said first and second writing voltages, respectively.

15. The apparatus of claim 14, wherein said synthesizing means includes a capacitor.

16. The apparatus of claim 14, further comprising:

inverting means for inverting said generated threshold voltage in polarity, prior to synthesizing said generated threshold voltage with said second ramp voltage.

* * * * *